United States Patent [19]

Oono

[11] Patent Number: 5,218,425
[45] Date of Patent: Jun. 8, 1993

[54] MEASURING METHOD AND APPARATUS OF ROOF SURFACE

[75] Inventor: Masahiro Oono, Tokyo, Japan

[73] Assignee: Asahi Kogaku Kogyo Kabushiki Kaisha, Tokyo, Japan

[21] Appl. No.: 824,945

[22] Filed: Jan. 24, 1992

[30] Foreign Application Priority Data

Jan. 29, 1991 [JP] Japan .................................. 3-094646

[51] Int. Cl.⁵ .................................................. G01B 11/26
[52] U.S. Cl. .................................... 356/359; 356/353; 356/354
[58] Field of Search ............... 356/351, 353, 354, 356, 356/359

[56] References Cited

FOREIGN PATENT DOCUMENTS 54-42675 12/1979 Japan .

OTHER PUBLICATIONS

Ballard, Stanley; *Optical Shop Testing;* pp. 108–111 and 134–135; 1978.

Primary Examiner—Samuel A. Turner
Assistant Examiner—LaCharles P. Keesee
Attorney, Agent, or Firm—Sandler Greenblum & Bernstein

[57] ABSTRACT

A roof surface measuring method including the making of a collimated bundle of rays incident upon roof surfaces at a predetermined incident angle, laterally displacing a part of the wavefront reflected by the roof surfaces in a direction parallel with an edge line defined by the intersection of the roof surfaces by a displacing means, and making the laterally displaced wavefront and the original wavefront incident upon a measuring surface in a manner which causes an interference therebetween. The invention is also directed to a measuring apparatus for effecting the method.

14 Claims, 6 Drawing Sheets

MEASURING METHOD AND APPARATUS OF ROOF SURFACE

BACKGROUND OF THE INVENTION

1. Field of the Invention

The present invention relates to a measuring method and apparatus of a roof surface of an optical element, such as a pentagonal roof prism used for example in a single lens reflex camera.

2 Description of Related Art

In a view finder of a single lens reflex camera, an image, formed on a focusing screen through a taking lens and a mirror, is converted to an erect image by a pentagonal roof prism allowing observation to be observed through an eyepiece. Therefore, if the pentagonal roof prism is not precisely assembled or manufactured, an unclear double image, for example, may appear in the view finder. This is caused particularly when the roof angle of the pentagonal roof prism is inaccurate or the edge of the roof surface is rounded. To avoid this, it is necessary to detect or measure an error in the angle of the roof surface (roof angle) and also to determine whether or not the roundness at the apex of the roof surface is within an allowable limit.

The detection requires that; ① the measurement can be quantified, ② the roof angle and the roundness can be independently or simultaneously detected, ③ the detection can be effected within a short period of time, and ④ the measurement is not adversely affected by a mechanical oscillation (external oscillation), etc., in addition to general requirements needed for common measurements.

SUMMARY OF THE INVENTION

The primary object of the present invention is to provide a measuring method of a roof surface of an optical element, such as a pentagonal prism, which satisfies all the requirements mentioned above.

To achieve the object mentioned above, according to the present invention, there is provided a roof surface measuring method, in which a collimated bundle of rays is made incident upon roof surfaces at a predetermined incident angle, laterally displacing a part of the wavefront reflected by the roof surfaces in a direction parallel to an edge line defined by the intersection of the two sides of the roof surface by a displacing means. The roof surface measuring method further provides that the laterally displaced wavefront and the original wavefront (i.e. the wavefront which is not laterally displaced) are made incident upon a measuring surface in a manner which causes an interference therebetween.

Preferably, the displacing means comprises a transparent wedge or transparent plate with parallel surfaces, so that the bundle of rays is reflected by both the front and back surface of the wedge or plate, laterally displacing the bundle of rays.

According to another aspect of the present invention, there is provided a roof surface measuring apparatus, comprising a light source which emits a collimated bundle of rays, an optical system for measuring the collimated bundle of rays incident upon roof surfaces at a predetermined incident angle, and a displacing means for laterally displacing a part of the wavefront reflected by the roof surfaces at a predetermined amount of displacement. The roof surface measuring apparatus further comprises an imaging optical system for imaging the laterally displaced bundle of rays and the original bundle of rays onto the same measuring surface.

With this arrangement, since parallel images, of the edge line defined by the roof surfaces, are formed on the measuring surface, and the interference fringes are formed in a direction which intersects the images, the roundness of the edge line can be detected based on the state of the images of the edge lines. The error of the roof angle can be detected based on the inclination angle of the interference fringes.

The present disclosure relates to subject matter contained in Japanese Patent Application No. 03-94646 (filed on Jan. 29, 1991) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

Figure 1:
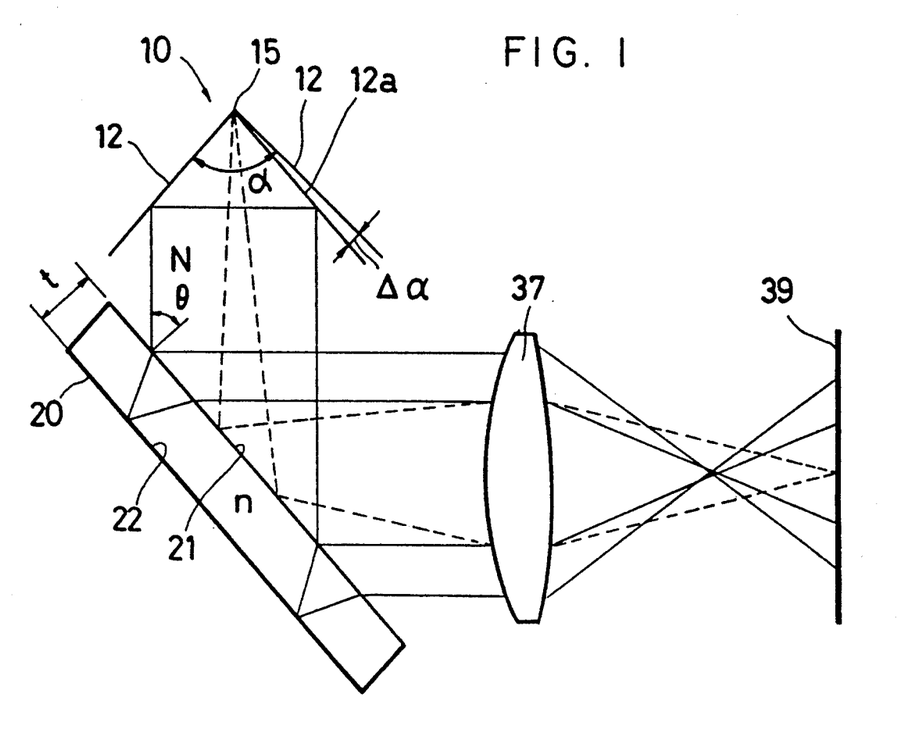
FIG. 1 is a schematic view of a main part of a measuring apparatus which carries out the measurement of a prism, according to an aspect of the present invention.

FIG. 1 shows an optical arrangement of a measuring apparatus to which a measuring method of the invention is applied.

Figure 2:
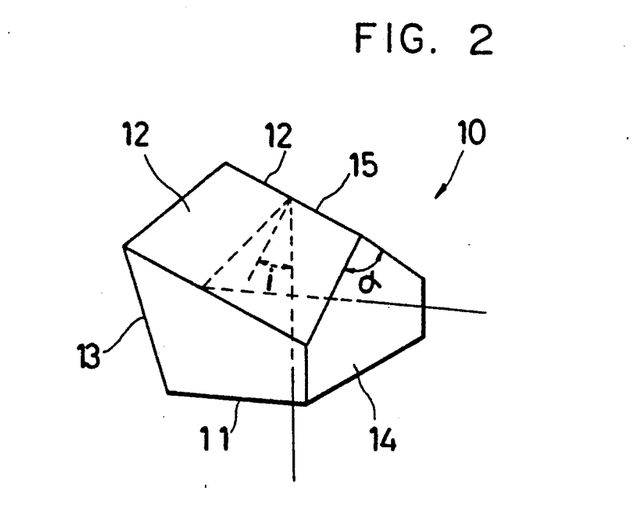
FIG. 2 is a perspective view of a pentagonal prism which is to be measured.

In the illustrated embodiment, the prism to be measured is a pentagonal prism 10 which is used in a finder optical system of a single lens reflex camera. The pentagonal prism 10 has a predetermined roof angle (design roof angle) represented by $\alpha$. The shape and construction of the pentagonal prism 10, as shown in FIG. 2 is per se known. In FIG. 2, when the pentagonal prism 10 is mounted to a single lens reflex camera, light of an object is incident upon a first surface 11 and is then reflected by a roof surface 12 and a third reflecting surface 13, before being emitted from a second surface 14.

In the illustrated embodiment, contrary to the case of an actual camera, collimated light is made incident upon the second surface 14, and is then reflected by the third reflecting surface 13 and the roof surface 12 before being emitted from the first surface 11. The outgoing light from the first surface 11 is reflected by both the front surface 21 and the back surface 22 of a transparent wedge 20, thereby causing a lateral displacement (lateral deviation) of a wave surface. As a result of the lateral displacement, an interference (shearing interference) takes place. The bundles of rays which are laterally deviated, along with those rays which are not deviated, are collected on a measuring surface 39 by an imaging lens 37 forming images. The interference fringe produced is then measured.

The wedge 20 is located at a predetermined angle with respect to the pentagonal prism 10 so that the light emitted from the first surface 11 is reflected by the wedge 20 at a predetermined angle (e.g., 90° in the illustrated embodiment) with respect to the edge line 15, as viewed from the side of the roof surfaces 12. In the illustrated embodiment, the wedge 20 has a wedge angle $\Delta\gamma$ (not shown) defined by its front and back surfaces 21 and 22 in a direction out of the page, i.e., the planar surfaces 21 and 22 diverge in a direction coming out of the page to define the angle $\Delta\gamma$. The parallel bundle of rays is formed by a laser light emitted by a laser diode 31, transmitted through an objective lens 33 and collimated by a collimating lens 35.

Figure 3:
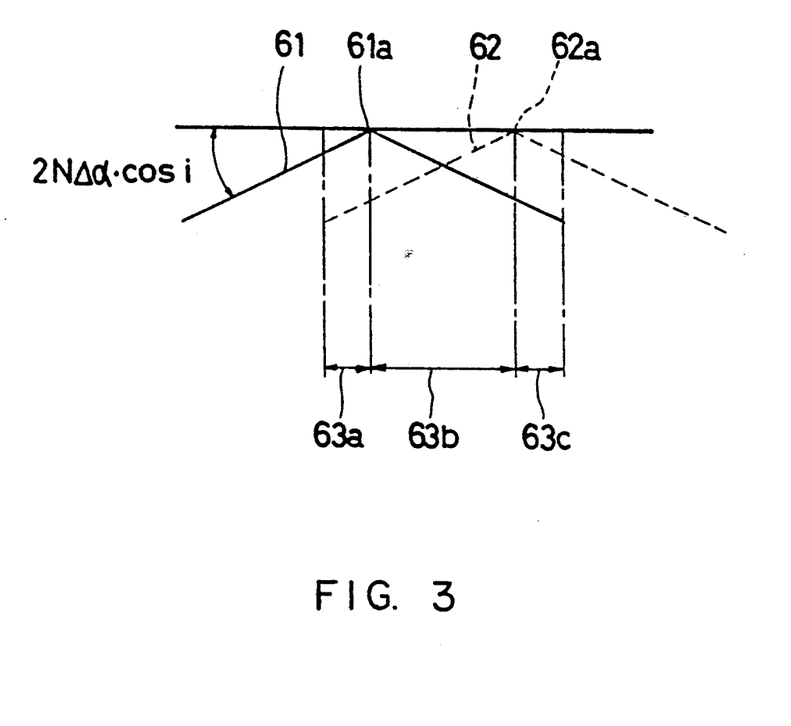
FIG. 3 is an explanatory view of the lateral displacement of a wave surface created by a transparent wedge as projected onto a measuring surface.

The laterally displaced wave surfaces (wavefronts) 61 and 62, which are reflected by the roof surfaces 12 and the front and back surfaces 21 and 22 of the wedge 20, are shown in FIG. 3. The apexes 61a and 62a (FIG. 3) of the wave surfaces 61 and 62 are defined by the projection of the edge line 15 onto the measuring surface 39. Due to the wave surfaces 61 and 62, interference fringes are formed on sections 63a, 63b and 63c of the measuring surface 39. Since the laterally displaced wavefront and the original wavefront are parallel to each other in the sections 63a and 63c, parallel interference fringes are produced by the wedge angle $\Delta\gamma$. In the other hand, in the section 63b, since the laterally displaced wavefront intersects the original wavefront, longitudinal fringes corresponding to a phase difference are produced, and consequently, oblique interference fringes are formed on the measuring surface 39 as a result of the combination of the longitudinal fringes and the lateral fringes due to the wedge angle $\Delta\gamma$.

Figure 4A:
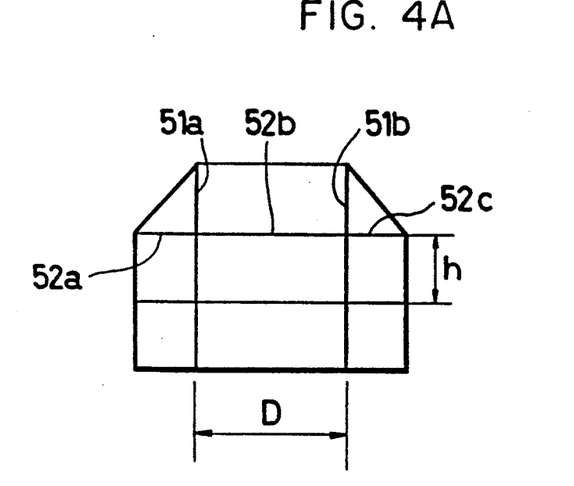
FIGS. 4A, 4B and 4C are schematic views of interference fringes as measured by the measuring apparatus, as shown in FIG. 1.
Figure 4B:
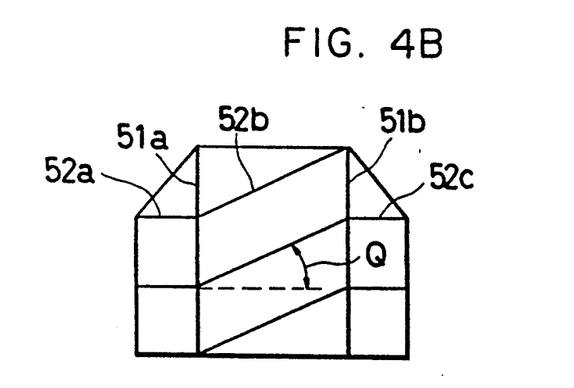
Figure 4C:
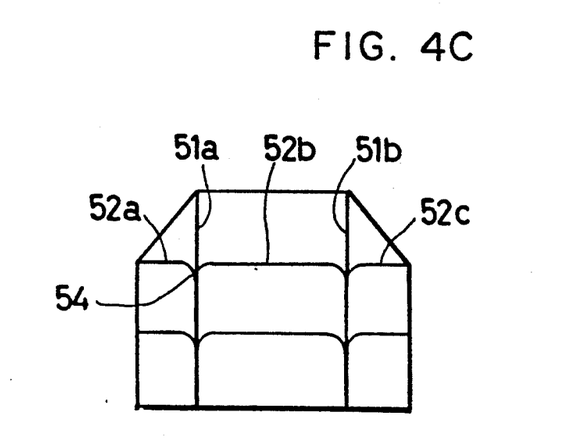
Figure 5:
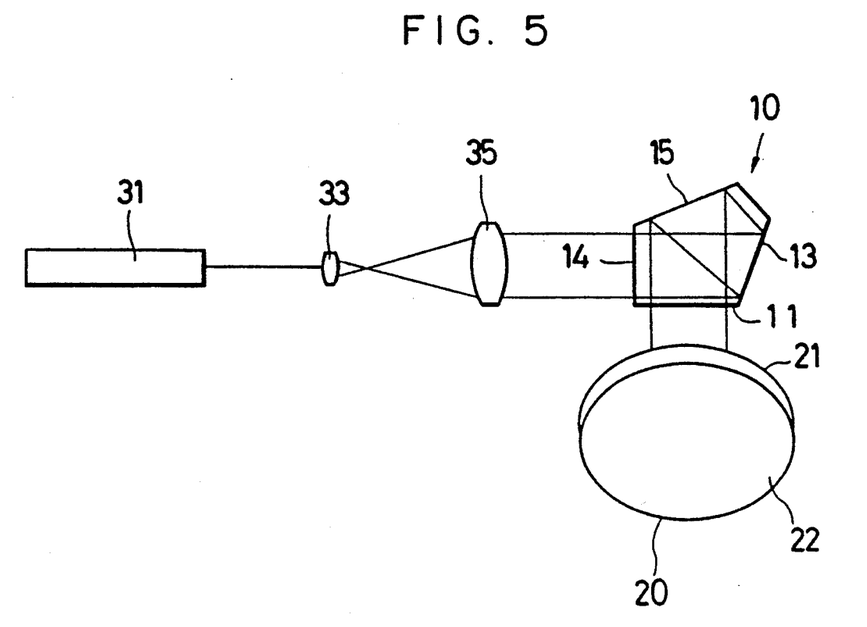
FIG. 5 is a front elevational view of an optical arrangement performing a measuring method according to the present invention.

The interference fringes thus formed on the measuring surface 39 are shown in FIGS. 4A, 4B and 4C, by way of example In FIGS. 4A, 4B and 4C, lines 51a and 51b represent images of the edge line 15 which are formed by the reflection by the front surface 21 and the back surface 22 of the wedge 20. Note that if the edge line 15 is ideally prepared, no image (images 51a and 51b) will be formed. However, normally interference fringes 52a, 52b and 52c are formed in the sections 63a, 63b and 63c in FIG. 3.

FIG. 4A shows interference fringes when the roof angle $\alpha$ of the pentagonal prism 10 is precisely identical to a predetermined design value, and when there is no roundness at the apex thereof. If there is an error $\Delta\alpha$ (rad) of the roof angle, the interference fringes 52b are inclined by an angle Q, as shown in FIG. 4B. If there is a roundness to the roof angle, the boundaries between the interference fringes 52b and the interference fringes 52a and 52c are bent, as shown in FIG. 4C. As a result of the deformation of the interference fringes 52, as mentioned above, an error in the roof angle and the roundness can be detected. Furthermore, the amount and direction (positive or negative) of the roof angle error can be quantifiably measured by the inclination angle $\theta$ and the inclination direction of the interference fringes 52. Similarly, the amount and direction (positive or negative) of the roundness can be quantifiably measured by the amount and the direction of deformation of the boundaries between the interference fringes 52b and the interference fringes 52a and 52c.

The following discussion will be directed to relationships between various parameters of the pentagonal prism and the transparent wedge 20, including the distance "D" between the images 51 (51a and 51b) of the edge line 15, (i.e., the lateral displacement of the wavefronts created by the wedge 20), the inclination angle "Q" of the interference fringes 52b, and the refractive index "N" of the pentagonal prism 10. The parameters further include refractive index "n" of the wedge 20, the thickness "t" of the wedge 20, the incident angles "$\theta$" and "i" of light emitted from the pentagonal prism 10 and made incident upon the wedge 20, and edge line 15.

The lateral deviation D is given by the following equation;

$$D = t \cdot \sin 2\theta (n^2 - \sin^2\theta)^{-\frac{1}{2}} \qquad (1)$$

When $n=1.5$ and $\theta=45°$, $D=0.75t$.

Next, when the wedge 20 has a wedge angle $\Delta\gamma$ in a direction perpendicular to the sheet of the drawing $\Delta\alpha$ is obtained by the following formula (2);

$$\Delta\alpha = [\{(n^2 - \sin^2\theta)^{\frac{1}{2}} \cdot \Delta\gamma\}/(2 \cdot N \cdot \cos i)] \tan Q \qquad (2)$$

When $\Delta\gamma = 1'$, $\theta = 45°$, $n = 1.5$, $N = 1.5$, $i = 21°$, and $Q = 45°$, $\Delta\alpha \approx 28''$.

The pitch h of the interference fringes 52 is determined only by the wedge angle $\Delta\gamma$ and the refractive index n of the wedge 20.

The wedge 20 can be replaced with a transparent plate with parallel surfaces in the present invention. In a preferred embodiment, the transparent plate is located at the same position as the wedge 20. The interference fringes formed by the plate are shown in FIGS. 8A, 8B and 8C, by way of example.

Since the plate has no wedge angle ($\Delta\gamma = 0$), there is no lateral fringe produced as when using the transparent wedge, and accordingly, only the longitudinal fringes due to the phase difference between the laterally deviated wavefront and the original wavefront will be produced. In FIGS. 8A through 8C, the lines 71a and 71b represent images corresponding to the images 51a and 51b in FIGS. 4A through 4C, respectively. Numeral 72 represents the interference fringes corresponding to the interference fringes 52b in FIGS. 4A through 4C.

Figure 8A:
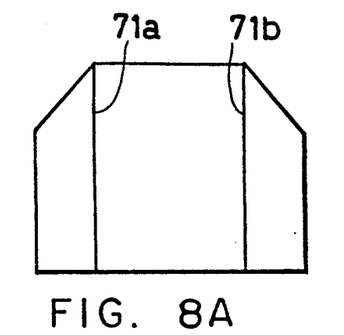
FIGS. 8A, 8B and 8C are schematic views of interference fringes measured by a measuring apparatus using a transparent plate with parallel surfaces in place of a wedge, according to the present invention.
Figure 8B:
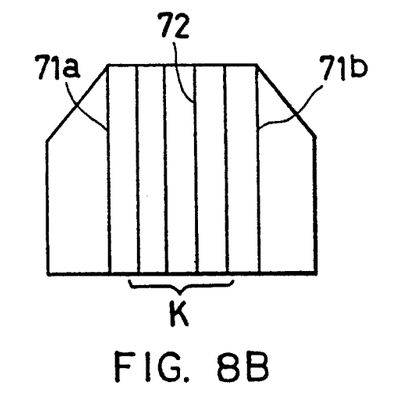
Figure 8C:
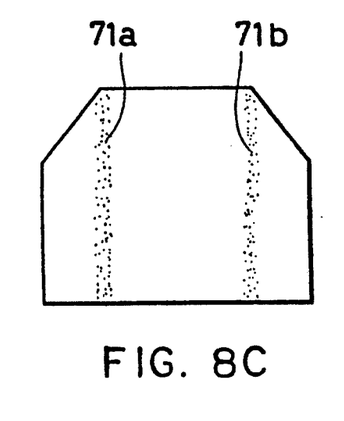

FIG. 8A shows an absence of the interference fringes 72 when the roof angle o of the pentagonal prism 10 is precisely identical to a predetermined design value, and when there is no roundness to the roof angle $\alpha$. FIG. 8B shows the interference fringes 72 when there is an error in the roof angle. FIG. 8C shows dimmed images 71a and 71b of the edge line 15 due to the roundness.

Here, since the wedge angle $\Delta\gamma$ is zero ($\Delta\gamma = 0$), $\Delta\alpha$ can be obtained by the following equation (3);

$$\Delta\alpha = K \cdot \lambda / (4 \cdot N \cdot D \cdot \cos i) \qquad (3)$$

where $\lambda$ designates the wavelength of the bundle of rays, and K the number of interference fringes.

When $\lambda = 0.6328 \mu$, $D = 7.5$ mm, $i = 21°$, $N = 1.5$, and $K = 1$, we have $\Delta\alpha \approx 3''$.

Figure 6:
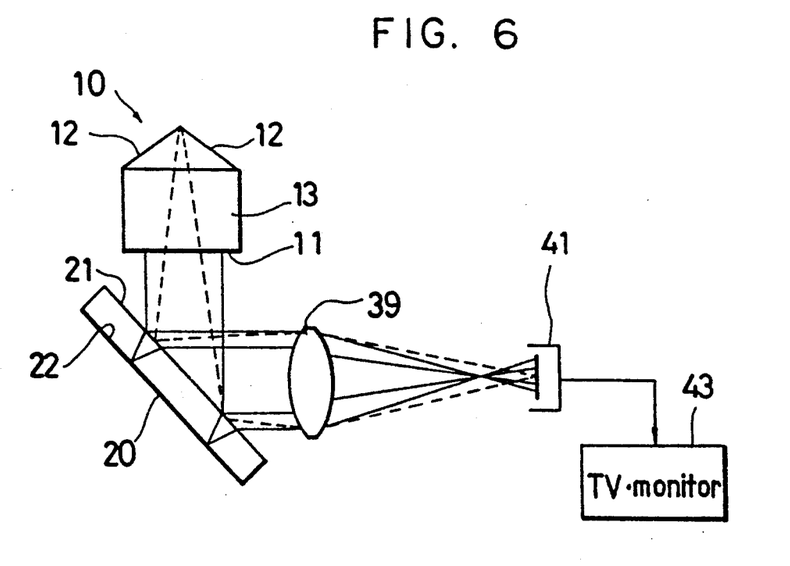
FIG. 6 is a side elevational view of the optical arrangement, as shown in FIG. 5.
Figure 7A:
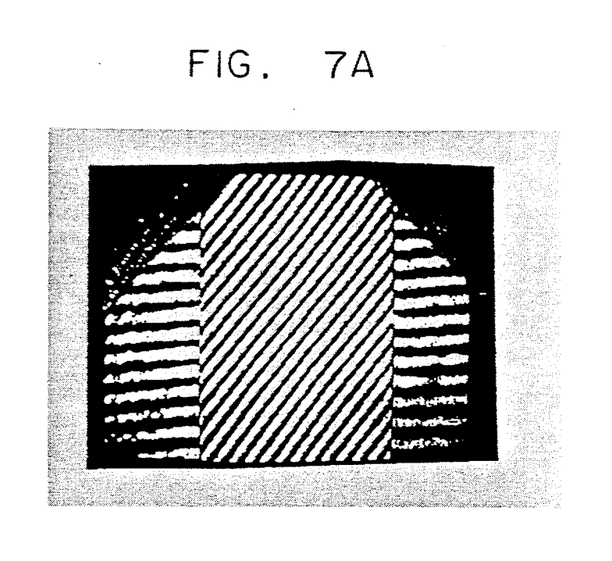
FIGS. 7A and 7B are pictures of interference fringes taken by the measuring apparatus, as shown in FIG. 1, by way of example.
Figure 7B:
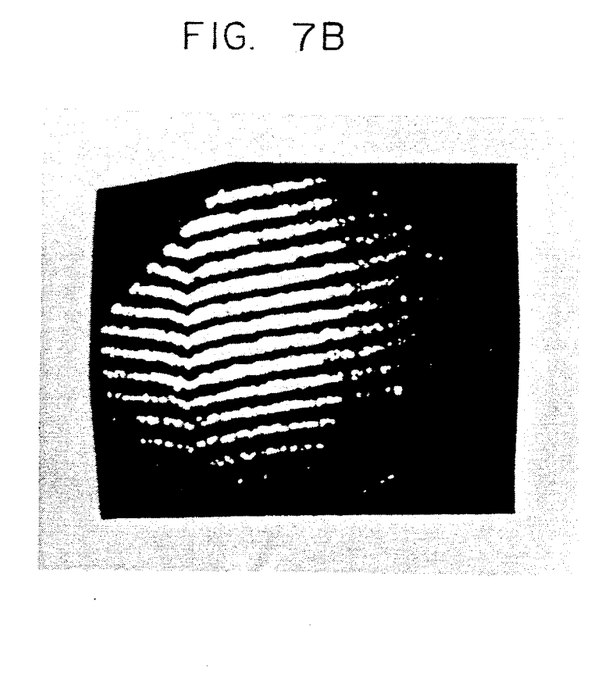

FIG. 6 shows an optical arrangement in which a CCD camera 41 is provided on or in the vicinity of the measuring surface 39. The shearing fringes are formed on photosensitive surfaces of imaging elements (not shown) of the CCD camera 41, similar to those formed on the measuring surface 39. The focal point of the CCD camera 41 is adjusted in such a way that the bundle of rays reflected by the wedge 20 at the substantially intermediate portion thereof is converged at the focal point. Thus, when the interference fringes taken by the CCD camera 41 are reproduced by a TV monitor 43, the interference fringes, as shown in FIGS. 7A and 7B, appear. It is determined from the interference fringes, as shown in FIG. 7A, that the pentagonal prism used, has a roof angle error of $\Delta\alpha \approx 4''$ and no roundness exists. Similarly, it is understood from the interference fringes, as shown in FIG. 7B, that the pentagonal prism used, has a roof angle error of $\Delta\alpha \approx 4''$ and a roundness of the edge line exists.

As can be seen from the above discussion, according to the present invention, since the roof angle error $\Delta\alpha$ and the roundness are independently represented by the respective interference fringes which are reproduced by the TV monitor 43, not only can the error in the roof angle be easily and quickly measured as quantitative values, but also the roundness can be easily measured.

Furthermore, since the wavefront of the bundle of rays reflected by the roof surfaces is laterally deviated or displaced by the wedge 20, even if the wedge 20 oscillates, there is no change in the optical path difference between the bundles of rays reflected by the front surface 21 and the back surface 22 of the wedge 20. The measurement is therefore not influenced by an external oscillation. Consequently, as a result of its stability, the measuring method of the present invention can be advantageously used in factories or other manufacturing lines in which equipment or apparatus tend to oscillate.

Although collimated beams are made incident upon the second surface 14 of the pentagonal prism 10 in the illustrated embodiment, it is possible to make the collimated beams incident upon the first surface 11 thereof, similar to the case of an actual camera.

Although the subject to be measured is directed to the roof surface of the pentagonal prism 10 in the illustrated embodiment, it goes without saying that the invention can be applied to any prism having a roof angle or any mirror having a roof angle.

As can be seen from the foregoing, according to the present invention, since the collimated beams are made incident upon the roof surfaces of the prism, so that the wavefront reflected by the roof surfaces is laterally deviated or displaced in a direction parallel to the edge line defined by the roof surfaces, the laterally deviated wavefront interferes with the original wavefront, so that the interference fringes thus produced can be observed. Thus, the roof angle of the roof surface and the roundness of the edge line can be independently, precisely, and quickly detected, Furthermore, if the bundle of rays is reflected by the front surface and the back surface of the transparent wedge or plate with parallel surfaces to laterally deviate or displace the same, even if the measuring apparatus oscillates, the interference fringes are not affected by the oscillation. Accordingly, a reliable measurement can be expected.

I claim:

1. A roof surface measuring method comprising the steps of: p1 making a collimated bundle of rays incident upon roof surfaces at a predetermined incident angle;
    laterally displacing, by means for displacing, a part of a wavefront reflected by said roof surfaces in a direction parallel to an edge line defined by an intersection of said roof surfaces; and,
    making said laterally displaced wavefront and original wavefront incident upon a measuring surface in a manner which causes an interference therebetween.

2. A roof surface measuring method according to claim 1, wherein said displacing means comprises a transparent wedge with front and back surfaces which define a predetermined wedge angle, and wherein said front and back surfaces of said transparent wedge reflect said bundle of rays to laterally displace the same.

3. A roof surface measuring method according to claim 2, wherein said transparent wedge is oriented such that said bundle of rays reflected by said roof surfaces is reflected in a direction perpendicular to said edge line of a prism having said roof surfaces as viewed from a side of said roof surfaces.

4. A roof surface measuring method according to claim 3, wherein said front surface of said transparent wedge is substantially parallel to said edge line.

5. A roof surface measuring method according to claim 4, wherein said lateral displacement is given by the following equation;

$$D = t \cdot \sin 2\theta (n^2 - \sin^2 \theta)^{-\frac{1}{2}}$$

wherein "D" designates a lateral displacement of the wavefronts by said transparent wedge, "n" represents a refractive index of said transparent wedge, "t" represents a thickness of said transparent wedge, "$\theta$" represents an incident angle of light incident upon said transparent wedge, and "i" represents an incident angle of light incident upon said edge line.

6. A roof surface measuring method according to claim 5, wherein said prism comprises a pentagonal roof prism.

7. A roof surface measuring method according to claim 6, wherein an error $\Delta\alpha$ said roof angle is given by the following equation;

$$\Delta\alpha = [\{n^2 - \sin^2\theta\}^{\frac{1}{2}} \cdot \Delta\gamma\}/(2 \cdot N \cdot \cos i)] \tan Q$$

wherein $\Delta\gamma$ designates said wedge angle, "Q" represents an inclination angle of said interference fringes formed on said measuring surface when a roof angle error $\Delta\alpha$ is equal to zero, and "N" represents a refractive index of said pentagonal roof prism.

8. A roof surface measuring method according to claim 1, wherein said displacing means comprises a transparent plate having parallel front and back surfaces which reflect said bundle of rays to laterally displace the same.

9. A roof surface measuring method according to claim 8, wherein said transparent plate is oriented such that said bundle of rays reflected by said roof surfaces is reflected in a direction perpendicular to said edge line of said prism as viewed from a side of said roof surfaces.

10. A roof surface measuring method according to claim 1, further comprising an imaging lens between said measuring surface and said edge line for forming images of said edge liens on said measuring surface.

11. A roof surface measuring method according to claim 1, wherein said roof surfaces to be measured are those of a pentagonal roof prism.

12. A roof surface measuring method according to claim 1, wherein said roof surfaces to be measured are formed by two mirrors.

13. A roof surface measuring apparatus including a light source which emits a collimated bundle of light rays, comprising;

an optical system for making said collimated bundle of rays incident upon roof surfaces to be measured at a predetermined incident angle;

a displacing means for laterally displacing a part of a wavefront reflected by said roof surfaces at a predetermined displacement; and an imaging optical system for imaging a laterally displaced bundle of rays and said original bundle of rays onto a same measuring surface.

14. A roof surface measuring apparatus according to claim 13, further comprising a CCD imaging device having a light receiving surface which defines said measuring surface.

* * * * *

UNITED STATES PATENT AND TRADEMARK OFFICE
CERTIFICATE OF CORRECTION

PATENT NO. : 5,218,425
DATED : June 8, 1993
INVENTOR(S) : M. OONO

It is certified that error appears in the above-indentified patent and that said Letters Patent is hereby corrected as shown below:

At column 5, line 65 (claim 1, line 2), delete "pl" and place the line beginning with "making" on a separate indented line.
At column 6, line 44 (claim 7, line 4), change "1/4" to ---1/2---.
At column 6, line 65 (claim 10, line 4), change "liens" to ---lines---.

Signed and Sealed this

Twenty-sixth Day of April, 1994

Attest:

BRUCE LEHMAN

Attesting Officer　　Commissioner of Patents and Trademarks